United States Patent [19]

Moyer

[11] Patent Number: 5,724,604
[45] Date of Patent: Mar. 3, 1998

[54] DATA PROCESSING SYSTEM FOR ACCESSING AN EXTERNAL DEVICE AND METHOD THEREFOR

[75] Inventor: William C. Moyer, Dripping Springs, Tex.

[73] Assignee: Motorola, Inc., Schaumburg, Ill.

[21] Appl. No.: 510,510

[22] Filed: Aug. 2, 1995

[51] Int. Cl.$^6$ .................................................. G06F 12/06
[52] U.S. Cl. ........................... 395/800.43; 395/800.38; 395/496; 395/500; 395/310
[58] Field of Search .................................. 395/800, 496, 395/559, 500, 494, 497.01, 490, 478, 479, 800.38, 800.43, 369, 310

[56] References Cited

U.S. PATENT DOCUMENTS

| | | | |
|---|---|---|---|
| 4,747,041 | 5/1988 | Engel et al. | 364/200 |
| 4,800,489 | 1/1989 | Moyer et al. | 395/416 |
| 5,151,986 | 9/1992 | Langan et al. | 395/550 |
| 5,243,701 | 9/1993 | Muramatsu et al. | 395/405 |
| 5,263,141 | 11/1993 | Sawaki | 395/425 |
| 5,280,598 | 1/1994 | Osaki et al. | 395/425 |
| 5,448,744 | 9/1995 | Eifert et al. | 395/800 |
| 5,483,660 | 1/1996 | Yishay et al. | 395/280 |
| 5,606,715 | 2/1997 | Yishay et al. | 395/800 |
| 5,617,559 | 4/1997 | Le et al. | 395/496 |
| 5,619,471 | 4/1997 | Nunziata | 365/230.03 |
| 5,623,687 | 4/1997 | Yishay et al. | 395/800 |

FOREIGN PATENT DOCUMENTS 657 818 A1  6/1995  European Pat. Off. .

OTHER PUBLICATIONS

MC68332 User's Manual, published by Motorola, Inc. in 1990, pp. 4-27, 4-46.
Toshiba Data Sheet published by Toshiba Americal Electronic Components, Inc., pp. A-133 to A-134.
Toshiba Data Sheet published by Toshiba Americal Electronic Components, Inc., pp. A-141 to A-142.
"Shrink systems with one-chip decoder, EPROM, and RAM," Electronic Design vol. 36, No. 17, Aug. 1988 Hasbrouck Heights, New Jersey.
"Method and address decode for input/output devices," IBM Technical Disclosure Bulletin, vol. 31, No. 8, Jan. 1989, New York.
European Search Report, Nov. 27, 1996, The Hague.

*Primary Examiner*—Larry D. Donaghue

[57] ABSTRACT

A data processing system (15) allows a user great flexibility in interfacing with a variety of memory devices (50, 55) and external peripheral devices (70, 72). In the data processing system, a control register (300, 400) is provided for dynamically controlling a function of a plurality of byte enable signals (204, 206, 208, 210) provided to any external device. In a first case, the register may indicate that the plurality of byte enable signals should function as a plurality of write enable signals. However, in a second instance, the register may indicate that the plurality of byte enable signals should function as a plurality of byte enable signals. The use of the register to determine a function of the byte enable signals allows a user greater functional flexibility without software intervention and without increasing a number of external integrated circuit pins required to select an external device.

30 Claims, 4 Drawing Sheets

| 31-15 | 14 | 13 12 11 10 9 8 | 7 | 6 5 4 | 3 | 2 | 1 | 0 |
|---|---|---|---|---|---|---|---|---|
| R | 0 | WSC | WSC | DA | EBC | DSZ | WP | PF | PA | CSEN |
| W | | | | | | | | |

RESET: 0 ... 0 0 0

95

400

| 31-15 | 14 | 13 12 11 10 9 8 | 7 | 6 5 4 | 3 | 2 | 1 | 0 |
|---|---|---|---|---|---|---|---|---|
| R | 0 | WSC | DA | EBC | DSZ | WP | PF | PA | CSEN |
| W | | | | | | | | |

RESET: 0 ... 0 0 0

DATA PROCESSING SYSTEM FOR ACCESSING AN EXTERNAL DEVICE AND METHOD THEREFOR

CROSS REFERENCE TO RELATED, COPENDING APPLICATIONS

Related subject matter is contained in the following patents and patent application:

1. U.S Pat. No. 5,448,744, entitled "Integrated Circuit Microprocessor with Programmable Chip Select Logic" by James B. Eifert et al., filed Nov. 6, 1989, and assigned to the assignee hereof;

2. Ser. No. 08/298,892, entitled "Integrated Circuit Microprocessor with Programmable Memory Access Interface Types" invented by Chinh H. Le et al., filed Aug. 31, 1994, and assigned to the assignee hereof;

3. U.S Pat. No. 5,502,835, entitled "Method for Synchronously Accessing Memory" invented by Chinh H. Le et al., filed Dec. 12, 1994, and assigned to the assignee hereof;

4. U.S Pat. No. 5,511,182, entitled "Programmable Pin Configuration Logic Circuit for Providing a Chip Select Signal and Related Method" invented by Chinh H. Le et al., filed Aug. 31, 1994, and assigned to the assignee hereof; and 5. U.S. Pat. No. 5,617,559, entitled "Modular Chip Select Control Circuit and Method for Performing Pipelined Memory Accesses" invented by Chinh H. Le et al., filed Aug. 31, 1994, and assigned to the assignee hereof.

FIELD OF THE INVENTION

The present invention relates in general to a data processing system, and more particularly to a method and apparatus for accessing an external device in a data processing system.

BACKGROUND OF THE INVENTION

Integrated circuit microprocessors must, in many cases, be connected with other integrated circuit devices in order to provide certain functions. Examples of such external devices include memories, serial interface adapters, analog-to-digital converters and many others. In most cases, each such external device will require external control signals in order for the device to be appropriately activated when accessed by the microprocessor. For example, a static random access memory (SRAM) integrated circuit requires the chip enable, output enable, and write enable control signals to control read and write accesses. The timing requirements of these signals differ somewhat between commercially available devices. For example, some SRAMs provide output data asynchronously with respect to the output enable signal, whereas other SRAMs sample output enable and provide output data synchronously with a clock signal.

Typically, a designer of a system using a microprocessor and other integrated circuits will use "glue logic" to generate the required chip select signals from the address and bus control signals produced by the microprocessor itself. This extra logic adds significantly to the cost of the system being designed and may degrade performance, and therefore is highly undesirable.

The 80186 (also referred to as the iAPX 186), available from the Intel Corporation of Santa Clara, Calif., is an integrated circuit microprocessor which has internal logic for generating chip select signals. The chip select logic has limited ability to program the address range for which each of the seven possible chip selects is active and can programmably insert wait states into the bus cycles for which each chip select is active. In addition, some of the chip selects may be programmed to be active in only the memory or I/O address spaces of the microprocessor.

Another example of an integrated circuit microprocessor with onboard chip select logic is that disclosed by John A. Langan and James M. Sibigtroth in U.S. Pat. No. 5,151,986, issued Sep. 29, 1992. The disclosed chip select logic includes a control register by means of which the timing, polarity and number of wait states can be individually programmed for each of several chip select outputs.

A major problem associated with the integration of chip select logic onto a microprocessor integrated circuit involves the provision of sufficient flexibility to the user. The use of glue logic is extremely flexible, since the system designer has wide latitude in the placement of each external device with the microprocessor's memory map and the timing and other characteristics of the chip select signals themselves. This flexibility is very useful, since the variety of possible system designs and chip select requirements for particular peripheral devices is great. Providing sufficient flexibility in an integrated chip select unit while constraining the size and complexity of the unit within reasonable limits is quite difficult.

At the same time, it is important to minimize the cost of the integrated circuit. Several factors contribute to cost of integrating chip select logic. One factor is the amount of circuit area required by the chip select logic, because a larger chip size decreases the number of available die per wafer, etc. Another factor is the number of device pins, because larger pin-count packages are generally more expensive. A third factor is the amount of engineering effort required to design the chip, and a chip which requires less design time is preferable. Thus, there is a need for a flexible yet low-cost chip select logic circuit for integrated circuit microprocessors.

BRIEF DESCRIPTION OF THE DRAWINGS

FIG. 4 illustrates in block diagram form a chip select control register of the portion of the system integration circuitry of FIG. 2.

DESCRIPTION OF THE PREFERRED EMBODIMENTS

Figure 1:
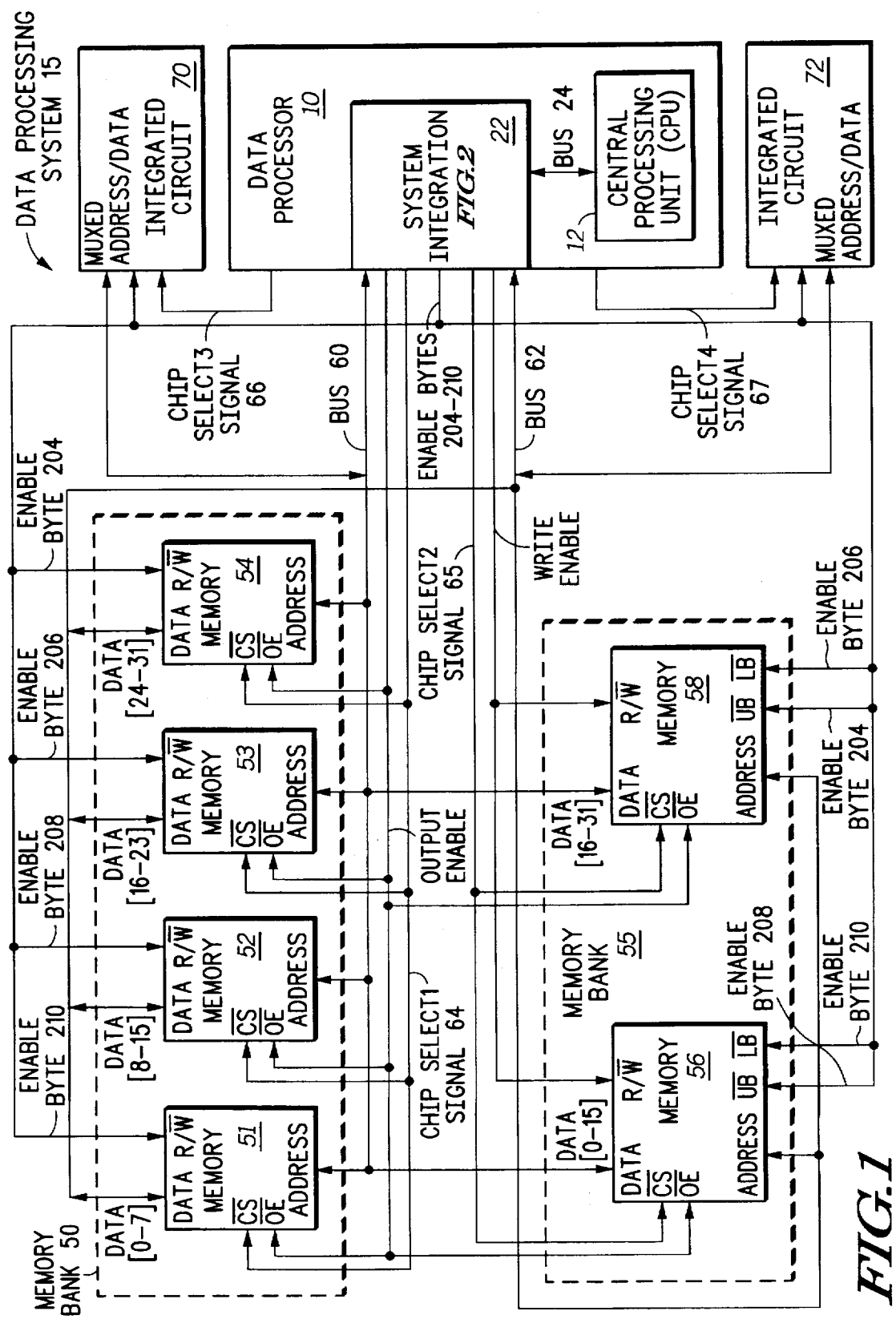
FIG. 1 illustrates, in block diagram form, a data processing system in accordance with one embodiment of the present invention.

The present invention provides a data processing system and method of operating the data processing system which allows a user great flexibility in selecting both a variety of memory devices and external peripheral devices that will interface with the system. In the data processing system, a control register is provided for dynamically controlling a function of a plurality of byte enable signals provided to any external device. For example, at a first time, the register may indicate that the plurality of byte enable signals should function as a plurality of write enable signals. However, at a second time, the register may indicate that the plurality of byte enable signals should function as a plurality of byte enables. The plurality of byte enables are especially useful for retrieving data which has fewer bits than the bit width of an external bus. Thus, the present invention allows a user greater functional flexibility without increasing a number of external integrated circuit pins required to select an external device.

Additionally, the present invention provides the additional functionality of the plurality of byte enable signals without requiring a software implementation. In the present invention, the function of the plurality of byte enable signals is determined during each bus cycle by an enable byte value stored in the aforementioned control register. When a predetermined chip select signal is asserted, a corresponding enable byte value is retrieved from an internal memory and stored in the control register. Therefore, no software programming is required to enable the plurality of chip select signals to function as either write enables or byte enables. By providing such flexibility with little required intervention, the present invention provides a low-cost chip select logic circuit for use with all integrated circuit microprocessors.

In a following discussion, the connectivity and operation of one embodiment of a data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, brackets will be used to indicate the conductors of a bus or the bit locations of a value. For example, "bus 60 [0–7]" or "conductors [0–7]of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Referring now to FIG. 1, FIG. 1 illustrates a data processing system 15 having a data processor 10, a memory bank 50, a memory bank 55, an integrated circuit 70, and an integrated circuit 72. Data processor 10 includes a central processing unit (CPU) 12 and a system integration circuit 22. Memory bank 50 includes a memory 51, a memory 52, a memory 53, and a memory 54. Memory bank 55 includes a memory 56 and a memory 58. In one embodiment of the present invention, data processor 10 and each of memories 51 through 54 and memories 56 and 58 is implemented as a separate integrated circuit. In alternate embodiments of the present invention, all of data processing system 15 may be implemented on a single integrated circuit.

In FIG. 1, memory 51 of memory bank 50 has a data port which is coupled to conductors [0–7] of bus 62 for receiving data bits [0–7]. Memory 51 also has an address port which is coupled to conductors [0–31] of bus 60. In addition, memory 51 has a chip select input ($\overline{CS}$) which is coupled to a Chip Select1 conductor 64 for receiving a first chip select signal. Memory 51 also has an output enable input ($\overline{OE}$) which is coupled to an Output Enable signal and a Read/Write (R/$\overline{W}$) input which is coupled to an Enable Byte signal 210.

Memory 52 has a data port which is coupled to conductors [8–15] of bus 62 for receiving data bits [8–15]. Memory 52 also has an address port which is coupled to conductors [0–31] of bus 60. In addition, memory 52 has a chip select input ($\overline{CS}$) which is coupled to Chip Select1 conductor 64 for receiving the first chip select signal. Memory 52 also has an output enable input ($\overline{OE}$) which is coupled to an Output Enable signal and a Read/Write (R/$\overline{W}$) input which is coupled to an Enable Byte signal 208.

Similarly, memory 53 has a data port which is coupled to conductors [16–23] of bus 62 for receiving data bits [16–23]. Memory 53 also has an address port which is coupled to conductors [0–31] of bus 60. In addition, memory 53 has a chip select input ($\overline{CS}$) which is coupled to Chip Select1 conductor 64 for receiving the first chip select signal. Memory 53 also has an output enable input ($\overline{OE}$) which is coupled to an Output Enable signal and a Read/Write (R/$\overline{W}$) input which is coupled to an Enable Byte signal 206.

Memory 54 has a data port which is coupled to conductors [24–31] of bus 62 for receiving data bits [24–31]. Memory 54 also has an address port which is coupled to conductors [0–31] of bus 60. In addition, memory 54 has a chip select input ($\overline{CS}$) which is coupled to Chip Select1 conductor 64 for receiving the first chip select signal. Memory 54 also has an output enable input ($\overline{OE}$) which is coupled to an Output Enable signal and a Read/Write (R/$\overline{W}$) input which is coupled to an Enable Byte signal 204.

Memory 56 of memory bank 55 has a data port which is coupled to conductors [0–15] of bus 62 for receiving data bits [0–15]. Memory 56 also has an address port which is coupled to conductors [0–31] of bus 60. In addition, memory 56 has a chip select input ($\overline{CS}$) which is coupled to a Chip Select2 conductor 65 for receiving a second chip select signal. Memory 56 also has an output enable input ($\overline{OE}$) which is coupled to the Output Enable signal and a Read/Write (R/$\overline{W}$) input which is coupled to a Write Enable signal. Memory 56 also has an upper byte ($\overline{UB}$) input which is coupled to Enable Byte signal 208 and a lower byte ($\overline{LB}$) input which is coupled to Enable Byte signal 210.

Memory 58 of memory bank 55 has a data port which is coupled to conductors [16–31] of bus 62 for receiving data bits [16–32]. Memory 58 also has an address port which is coupled to conductors [0–31] of bus 60. In addition, memory 58 has a chip select input ($\overline{CS}$) which is coupled to Chip Select2 conductor 65 for receiving a second chip select signal. Memory 58 also has an output enable input ($\overline{OE}$) which is coupled to the Output Enable signal and a Read/Write (R/$\overline{W}$) input which is coupled to the Write Enable signal. Memory 58 also has an upper byte ($\overline{UB}$) input which is coupled to Enable Byte signal 204 and a lower byte ($\overline{LB}$) input which is coupled to Enable Byte signal 206.

Data processor 10 is coupled to memory bank 50 by busses 60 and 62 and by chip select conductor 64. Data processor 10 is coupled to memory bank 55 by busses 60 and 62 and by chip select conductor 65. Data processor 10 is coupled to integrated circuit 70 by bus 60 and by a Chip Select3 conductor 66. A muxed address/data port of integrated circuit 70 communicates both address and data values with bus 60. Integrated circuit 70 is not coupled to and does not receive any address or data values from bus 62. Data processor 10 is coupled to integrated circuit 72 by bus 62 and by chip select conductor 67. A muxed address/data port of integrated circuit 72 communicates both address and data values with bus 62. Integrated circuit 70 is not coupled to and does not receive any address or data values from bus 60.

Note that in some embodiments of the present invention, data processor 10 is formed on a single integrated circuit. In some embodiment, data processor 10 is a single chip microcontroller. In alternate embodiments, data processor 10 may be implemented using any type of electrical circuitry. Memories 51 through 54 and 56 through 59 may be any type of memory. Alternate embodiments of data processing system 15 may include more, fewer, or different peripheral devices (70 and 72). In addition, although busses 60 and 62 have been illustrated as 32-bit busses, alternate embodiment of the present invention may use any number of bits in busses 60 and 62.

Figure 2:
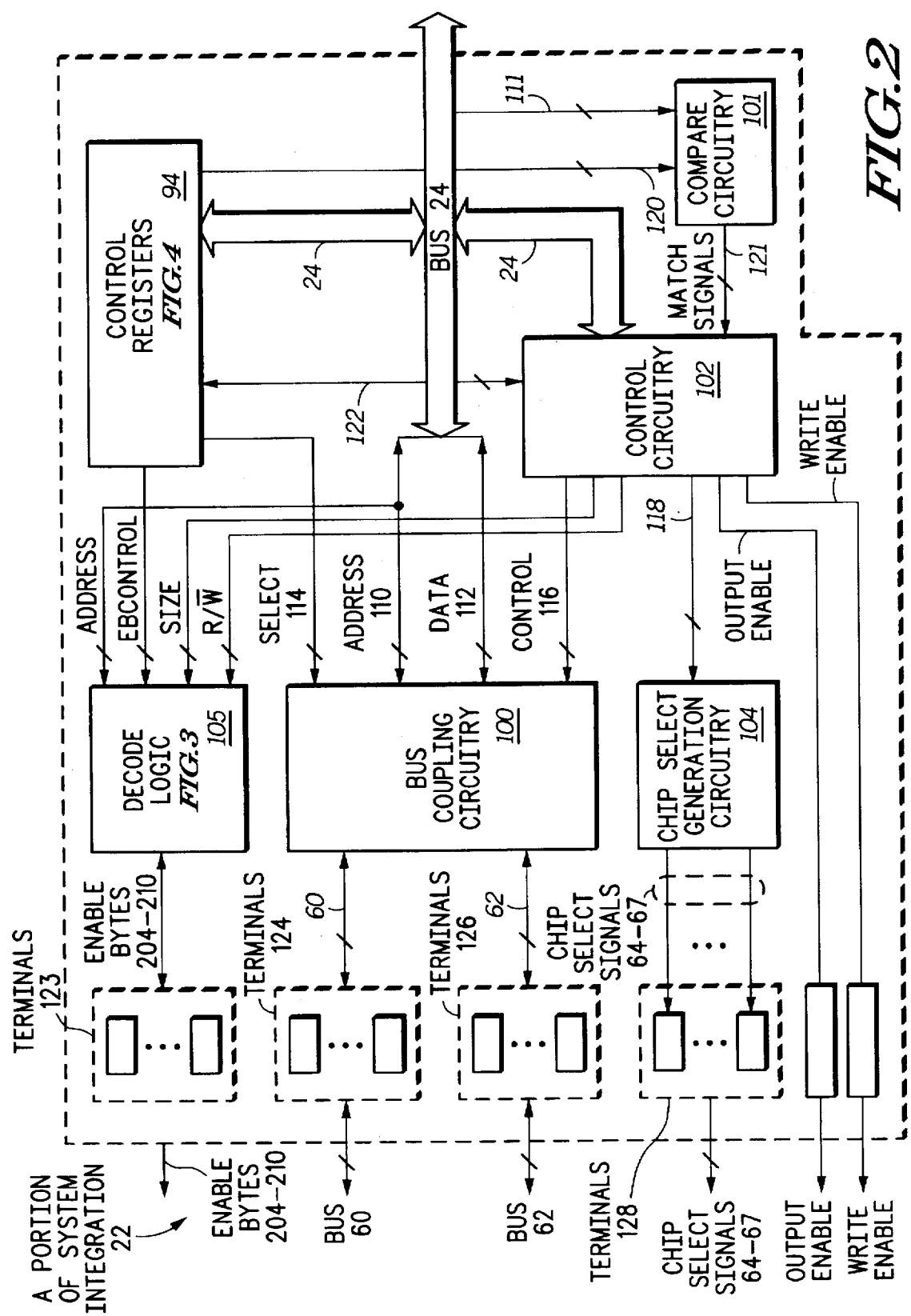
FIG. 2 illustrates, in block diagram form, a portion of system integration circuitry of the data processing system of FIG. 1.

FIG. 2 illustrates a portion of system integration circuitry 22 of FIG. 1 in accordance with one embodiment of the present invention. System integration circuitry 22 includes control registers 94, bus coupling circuit 100, compare circuitry 101, control circuitry 102, chip select generation circuitry 104, decode logic 105, terminals 123, terminals 124, terminals 126, and terminals 128. Bus 24 bi-directionally transfers address, data, and control information to each of control registers 94, control circuitry 102, and bus coupling circuitry 100. Address bus 110 is a portion of bus 24 which provides address bits [0–31] to bus coupling circuitry 100. Data bus 112 is a portion of bus 24 which provides data bits [0–31] to bus coupling circuitry 100. Control bus 116 is a portion of bus 24 which provides control information from bus coupling circuitry to control circuitry 102. Note that in some embodiments of the present invention, control circuitry 102 may provide external bus cycle control signals (e.g. address strobe, data strobe, write enable, column address strobe, row address strobe, read/ write, etc.) external to data processor 10 by way of one or more terminals (not shown). Bus 24 is coupled to control registers 94 such that CPU 12 may perform read and write accesses to control registers 94. Bus 24 is coupled to control circuitry 102 in order to provide and receive control information. Bus 24 is coupled to bus coupling circuit 100 by way of address bus 110 and data bus 112 in order to communicate address bits [0–31] and data bits [0–31]. And, bus 24 is coupled to compare circuitry 101 via a signal 111 to provide at least a portion of address bits [0–31].

Registers 94 include a plurality of peripheral control registers 95 (in FIG. 3) and a chip select control register (not shown herein). The chip select control register includes bus loading control bits, address range bits, and other chip select control bits. Bus loading control bits are provided to bus coupling circuit 100 by conductors 114. Compare circuitry 101 is coupled to the chip select control register to receive the address range bits, and possibly one or more of the other chip select control bits. Compare circuitry 101 provides compare results signals to control circuitry 102 via a plurality of conductors 121. Control circuitry 102 provides control signals to bus coupling circuit 100 by a plurality of conductors 116, and control circuitry 102 provides control signals to chip select generation circuitry 104 via a plurality of conductors 118. Control circuitry 102 is bi-directionally coupled to control registers 94. In one embodiment of the present invention, control circuitry 102 receives control bits from the chip select control bits stored in control registers 94 and provides status information back to other chip select control bits. Note that in alternate embodiments of the present invention, the functionality of control circuitry 102 and bus coupling circuit 100 may be combined into one circuit.

Bus coupling circuit 100 is bi-directionally coupled to terminals 124 via a bus 60. Bus coupling circuit 100 is bi-directionally coupled to terminals 126 via a bus 62. Chip select generation circuitry 104 is bi-directionally coupled to terminals 128 via a plurality of chip select conductors 64–67. The plurality of terminals 124 are used to provide bus 60 externally to data processor 10. The plurality of terminals 126 are used to provide bus 62 externally to data processor 10. And, the plurality of terminals 128 are used to provide chip select signals 64–67 externally to data processor 10.

Integrated circuit terminals 124, 126, and 128 may be any type of apparatus which allows electrical signals to be transferred to or from data processor 10. For example, integrated circuit terminals 124, 126, and 128 may be integrated circuit pins, solder bumps, or wire conductors.

Figure 3:
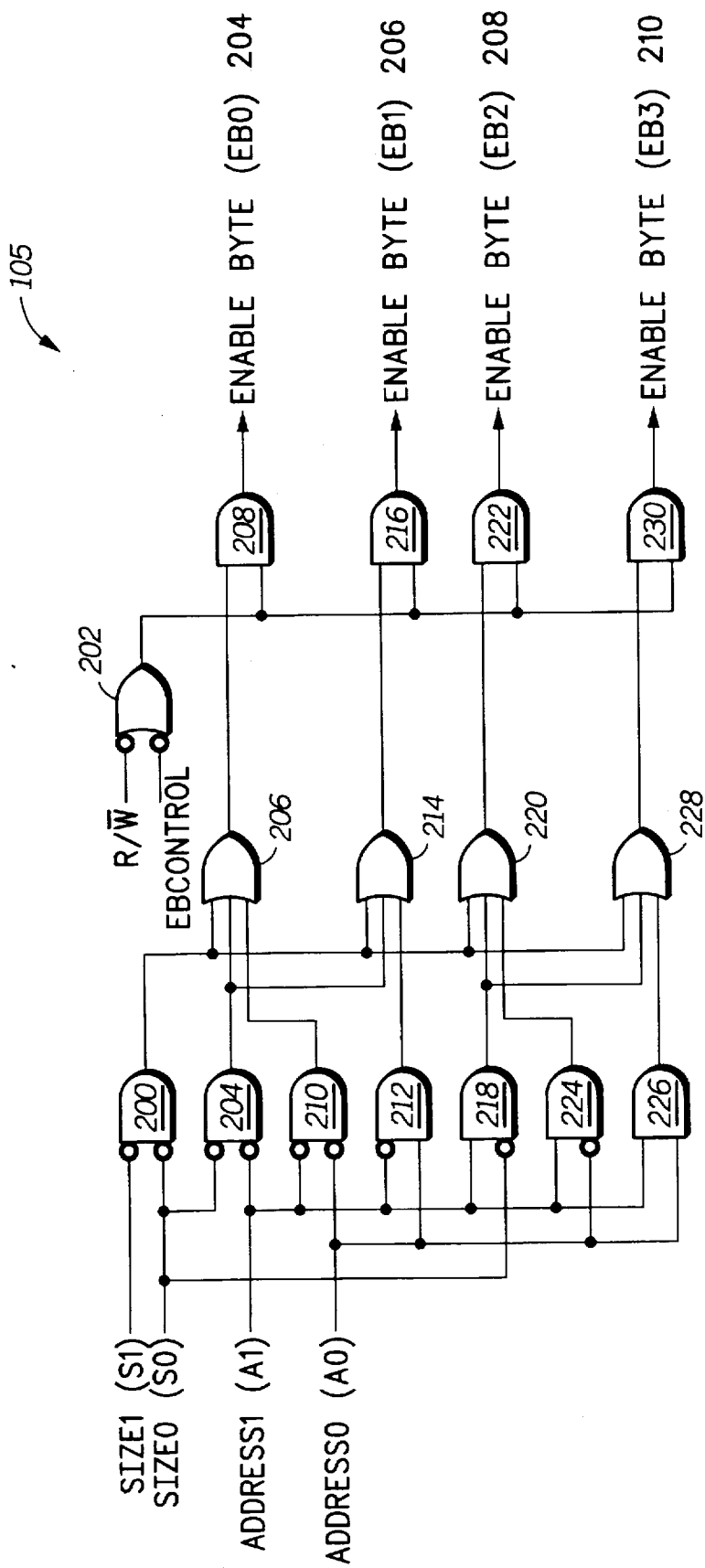
FIG. 3 illustrates, in block diagram form, a decode logic circuit of the portion of the system integration circuitry of FIG. 2.

FIG. 3 illustrates decode logic circuit 105 in greater detail. Decode logic circuit 105 includes an AND gate 200, an OR gate 202, an AND gate 204, an OR gate 206, an AND gate 208, an AND gate 210, an AND gate 212, an OR gate 214, an AND gate 216, an AND gate 218, an OR gate 220, and AND gate 222, an AND gate 224, an AND gate 226, an OR gate 228, and an AND gate 230.

A Size1(S1) signal is provided by the Size signal (not illustrated in FIG. 3) to a first inverted input of AND gate 200. A Size0 (S0) signal is also provided by the Size conductors to a second inverted input of AND gate 200, a first inverted input of AND gate 204, and a first inverted input of AND gate 218. An output of AND gate 200 is provided to a first input of each of OR gates 206, 214, 220, and 228. An Address1 (A1) signal is provided by Address bus 110 (of FIG. 2) to a second inverted input of AND gate 204, a first inverted input of AND gate 210, a first inverted input of AND gate 212, a second input of AND gate 218, a first input of AND gate 224, and a first input of AND gate 226. An Address0 (A0) signal is provided by Address bus 110 (of FIG. 2) to a second inverted input of AND gate 210, a second input of AND gate 212, a second inverted input of AND gate 224, and a second input of AND gate 226.

An output of AND gate 204 is coupled to a second input of OR gate 206 and to a second input of OR gate 214. An output of AND gate 210 is coupled to a third input of OR gate 206. An output of OR gate 206 is coupled to a first input of AND gate 208. An output of AND gate 212 is coupled to a third input of OR gate 214. An output of OR gate 214 is coupled to a first input of AND gate 216. An output of AND gate 218 is coupled to a second input of OR gate 220 and to a second input of OR gate 228. An output of AND gate 224 is coupled to a third input of OR gate 220. An output of OR gate 220 is coupled to a first input of AND gate 222. An output of AND gate 226 is coupled to a third input of OR gate 228. An output of OR gate 228 is coupled to a first input of OR gate 230.

A Read/Write (R/W) signal is coupled to a first inverted input of OR gate 202. A EBControl signal is coupled to a second inverted input of OR gate 202. An output of OR gate 202 is coupled to a second input of each of AND gates 208, 216, 222, and 230. An output of AND gate 208 provides the Enable Byte0 (EB0) signal 204. An output of AND gate 216 provides the Enable Byte1 (EB1) signal 206. An output of AND gate 222 provides the Enable Byte2 (EB2) signal 208. An output of AND gate 230 provides the Enable Byte3 (EB3) signal 210.

Referring now to FIG. 4, FIG. 4 illustrates control registers 94 of FIG. 2 in accordance with one embodiment of the present invention. In one embodiment of the present invention, control registers 94 include a plurality of registers 300 through 400 wherein a predetermined one of the plurality of registers corresponds to a predetermined one of the plurality of chip select signals. For example, a first chip select signal corresponds to control register 300 and a last chip select signal corresponds to control register 400. Each of the plurality of registers includes a CSEN (Chip Select ENable) bit which controls an operation of a corresponding one of the plurality of Chip Select signals 64 through 74. If the CSEN bit is a logic zero value for a given Chip Select signal, a corresponding integrated circuit terminal is disabled and an output is always negated. An attempt by data processor 10 to access an address mapped by the corresponding Chip Select signal will result in a transfer error and the Chip Select signal will not be asserted. When the CSEN bit is a logic one value, the corresponding integrated circuit terminal is enabled and provides an asserted Chip Select signal when an access address falls within a range corresponding to an external device and the Chip Select signal. The CSEN bit is cleared during a reset operation.

Additionally, each of the plurality of registers includes a PA (Pin Assert) bit. The PA bit is used to assert or negate an active-low output when the integrated circuit terminal corresponding to the Chip Select signal is operating as a programmable output pin. The PA bit is ignored if a PF bit is cleared or the CSEN bit is set.

Each of the plurality of registers also includes a PF (Pin Function) bit. The PF bit is used to select a function of the corresponding integrated circuit terminal. For example, when the PF bit is a logic zero value, the integrated circuit terminal is used as a chip select output. When the PF bit is a logic one value, the integrated circuit terminal is used as a programmable output control integrated circuit terminal if the CSEN bit is cleared.

Each of the plurality of registers 300 through 400 also includes a WP (Write Protect) bit. The WP bit is used to restrict write operations to an address range defined by a corresponding Chip Select signal. When the WP bit is a logic zero value, write operations are allowed in the address range defined by the corresponding Chip Select signal. When the WP bit is a logic one value, write operations are prohibited. If data processor 10 attempts to write to an address mapped by the corresponding Chip Select signal, a transfer error is sent to CPU 12 and the Chip Select signal is remains negated.

The DSZ (Data Port Size) bits illustrated in FIG. 4 define a data bit width of a device data port.

The EBC (Enable Byte Control) bits indicate which access types should assert a plurality of Enable Byte signals, referred to Enable Bytes 204 through 210 in FIG. 2. Additionally, the Enable Bytes are referred to as EB0 204, EB1 206, EB2 208, and EB3 210 in FIG. 4. When any one of the Enable Byte Control bits is a logic zero value, read and write accesses by data processor 10 are allowed to assert a corresponding one of the plurality of Enable Byte signals. Thus, when the EBC bits are a logic zero value, a corresponding Enable Byte signal is configured to operate as a byte enable. However, when any one of the Enable Byte Control bits is a logic one value, only write access by data processor 10 are allowed to assert a corresponding one of the plurality of Enable Byte signals. Therefore, when the EBC bits are a logic one value, the corresponding Enable Byte signal is configured to operate as a write enable. The EBC bits may be configured differently for each of the plurality of registers 95 and, therefore, for each of the plurality of Chip Select signals.

Each of the plurality of registers 95 also includes a DA (Device Attributes) value which is used to indicate device specific attributes and WSC (Wait State Control) value which programs a number of wait states for an access to an external device connected to a Chip Select signal. In this embodiment of the invention, an encoding of 111 indicates that an external Transfer Acknowledge (TA) input signal will be sampled to terminate a cycle. Note that a TA signal indicates when an external access has been terminated. All other encodings of the WSC bits enable an internally generated termination. When an access is internally terminated, a state of the TA signal is ignored.

Note that alternate embodiments of the present invention may use more, fewer, or different register bit fields, and each register bit field may be used for control, status, or both control and status. In addition, alternate embodiment of the present invention may locate bit fields such as the EBC bits in one or more separate registers. Also, different embodiments of the present invention may include any numbers of bits for each of the register bits fields illustrated in FIG. 4. Additionally, in some embodiments of the present invention, the control functionality of one or more of the register bit fields may be combined and encoded into fewer register bit fields.

Operation of the Present Invention

Operation of the present invention will now be discussed in greater detail. During operation of data processing system 15 illustrated in FIG. 1, data processor 10 may access data stored in either memory bank 50, memory bank 55, integrated circuit 70, and integrated circuit 72. Each of these external devices may require a different interface. For example, in the example illustrated in FIG. 1, each of memories 51 through 54 of memory bank 50 has a data bus bit width of eight bits. Alternatively, memories 56 and 58 of memory bank 55 have a data bus bit width of sixteen bits. Additionally, unlike memories 51 through 54, memories 56 and 58 require data processor 10 to specify whether only a lower byte or both an upper and a lower byte should be retrieved from the corresponding memory. Furthermore, integrated circuits 70 and 72 require a multiplexed data bus interface with data processor 10. Even given the significant differences in the interfaces of the memories of memory bank 50, the memories of memory bank 55, and integrated circuits 70 and 72, the present invention implemented in data processor 10 provides each external device with the appropriate control and data values without added logic circuitry or software intervention.

Before describing the present invention in greater detail, a general description of operation of data processing system 15 will be provided. In data processing system 15, each of the external devices is assigned an address range in a memory map of data processor 10. When data processor 10 accesses an address within a first address range which corresponds to memory bank 50, a Chip Select1 signal 64 is asserted to enable each of memories 51 through 54. Similarly, when data processor 10 accesses an address within a second address range which corresponds to memory bank 55, a Chip Select2 signal 65 is asserted to enable memories 56 and 58. Likewise, when data processor 10 accesses an address within either a third address range corresponding to integrated circuit 70 or a fourth address range corresponding to integrated circuit 72, a Chip Select3 signal or a Chip Select4 signal is respectively asserted.

When one of a plurality of Chip Select signals is asserted, other control information must also be provided to correctly interface with a corresponding external device. For example, even if the Chip Select1 signal is asserted, an Output Enable signal and a corresponding one of the plurality of Enable Byte signals must be asserted. As previously mentioned, the Output Enable signal is provided to the $\overline{OE}$ input of each of the plurality of memories 51 through 54. The corresponding one of the plurality of Enable Byte signals is also provided to the R/$\overline{W}$ input of an associated one of the plurality of memories 51 through 54. It should be noted that when the plurality of Enable Byte signals are provided to the R/$\overline{W}$ inputs, the plurality of Enable Byte signals are functioning as write enable signals. Note that in the present embodiment of the invention, each of the plurality of Enable Byte signals is considered asserted when it is a logic low value. Therefore, when one of the plurality of Enable Byte signals is asserted, the $\overline{OE}$ input is negated, and an appropriate Chip Select signal is asserted, an associated memory in memory bank 50 is enabled to store an eight bit data value provided by data processor 10 via bus 60. Similarly, when one of the plurality of Enable Byte signals is negated and the $\overline{OE}$ input is asserted, the associated memory in memory bank 50 is enabled to provide the eight bit data value to data processor 10 via bus 62.

In a second example, assume the Chip Select2 signal is asserted to indicate that data processor 10 has accessed an address location associated with memory bank 55. Again, when the Chip Select2 signal is asserted, other control information must also be provided to correctly interface with a corresponding external device. For example, even if the Chip Select2 signal is asserted, an Output Enable signal and a R/$\overline{W}$ signal must also be asserted. Additionally, because memories 56 and 58 each require an Upper Byte (UB) enable input and a Lower Byte (LB) enable input, at least one of the two Enable Byte signals corresponding to either memory must be asserted. In this example illustrated in FIG. 1, memories 56 and 58 provide data having sixteen bit. Because the data has sixteen bits, memories 56 and 58 also require data processor 10 to specify whether one or both of the upper and lower bytes of this data value are to be communicated with data processor 10. Therefore, in the second example, the plurality of Byte Enable signals must not be configured as write enable signals as for memories 51 through 54, but must be configured as byte enable signals for selectively enabling either memory 56 or memory 58 to communicate one or both of the upper and lower bytes of data. Whether the data is read or written is determined by a value of the R/$\overline{W}$ signal.

Control registers (as illustrated in FIG. 2) control the functionality of the Enable Byte signals such that each Enable Byte signal interfaces correctly with each external device. The control registers and the dynamic controllability of the Enable Byte signals will subsequently be discussed in greater detail.

During operation of data processor 10, the plurality of control registers 94 is written with chip select control information prior to execution of a data processing operation requiring chip select functionality. The chip select control information was previously described with respect to the plurality of control registers 94.

Furthermore, during operation of data processor 10, CPU 12 is capable of initiating an external bus cycle. An external bus cycle is a bus cycle that is driven external to data processor 10 via busses 60 and 62. CPU 12 initiates an external bus cycle by driving an address value, a corresponding data value, and appropriate control signals on bus 24. Compare circuitry 101 receives the address value from bus 24 and a plurality of address range bits from a register location (not illustrated) in the plurality of control registers 94. Compare circuitry 101 then determines an address range associated with the received address value. In one embodiment of the present invention, compare circuitry 101 compares at least a portion of the address value from bus 24 to each set of address range bits provided by the plurality of control registers 94. The plurality of address range bits may use any method and any number of bit fields to specify an address range.

Compare circuitry 101 then transfers control signals 121 control circuitry 102. Control signals 121 indicate which address range and, therefore, which Chip Select signal and which one of the plurality of registers 300 through 400 (of the plurality of control registers 94 illustrated in FIG. 4) will be used to control circuitry 102. Control circuitry 102 then provides control signals 118 to chip select generation circuitry 104 to select which of the plurality of Chip Select signals is to be asserted. Control circuitry 102 also sends control signals to the plurality of control registers 94 via conductors 122 to select which of the plurality of registers 300 through 400 will be selected. For example, if the received address value is in a first address range specified by a first plurality of address range bits, control circuitry 102 will select a first control register of the plurality of control registers 94. When the first control register is selected, the first control register will provide an EBControl signal with a logic value based on a value of a EBC bit stored therein to decode logic circuit 105. Similarly, if a second received address value is in a second address range specified the a second plurality of address range bits, control circuitry 102 will select a second control register of the plurality of control registers 94. When the second control register is selected, the second control register will provide as EBControl signal with a logic value based on a value of a EBC bit stored in the second control register to decode logic circuit 105. By determining a value of the EBControl signal in response to a value stored in a control register associated with a predetermined Chip Select signal, the EBControl signal may be dynamically modified on each byte access by data processor 10 without any type of software intervention.

In addition to the EBControl signal, the plurality of control registers 94 will provide chip select control bits to control circuitry 102 via conductors 122 and will provide a Select signals 114 to bus coupling circuitry 100. Based on the values provided by Select signals 114, bus coupling circuitry 100 will determine with which of bus 60 and bus 62 information should be communicated. Control circuitry 102 may provide timing or other control information to bus coupling circuit 100 via the plurality of conductors 116.

In FIG. 2, it should be noted that the plurality of terminals 124 provide bus 60 externally to data processor 10. The plurality of terminals 126 provide bus 62 externally to data processor 10 and the plurality of terminals 128 provide chip select signals 64 through 67 externally to data processor 10.

To determine a functionality of the Enable Bytes provided by the plurality of terminals 128, decode logic circuit 105 logically combines a portion of an address value communicated by Address conductors 110, the EBControl signal, the Size signals, and a R/$\overline{W}$ signal. The R/$\overline{W}$ signal indicates if data processor 10 is performing a read or a write operation. Furthermore, in this embodiment of the invention, the address value corresponds to address bits zero (A0) and one (A1) of an accessed address. The EBControl signal is selectively asserted in response to a value of the EBC bit in a selected one of the plurality of registers 300 through 400. As previously mentioned, when the EBC bit is negated, read and write accesses by data processor 10 are allowed to assert the plurality of Enable Byte outputs of decode logic 105. Thus, when the EBC bit is negated, the plurality of Enable Byte outputs are configured as byte enables. When the EBC bit is asserted, only write accesses by data processor 10 are allowed to assert the plurality of Enable Byte outputs of decode logic 105. Therefore, when the EBC bit is asserted, the plurality of Enable Byte outputs are configured as write enables, and not byte enables.

Size information is also required by decode logic 105 to determine a size of an access by data processor 10. In the present embodiment of the invention, two Size signals, Size0 (S0) and Size1(S1), indicate this information. When both S0 and S1 are logic zero values, four bytes should be accessed from an external memory. When S1 is a logic zero value and S0 is a logic one value, one byte should be accessed from the external memory. When S1 is a logic one value and S0 is a logic zero value, two bytes should be accessed from the external memory. A state when both S0 and S1 are logic one values is reserved for future use.

As previously mentioned, when the EBControl signal is asserted, the plurality of Enable Byte signals should act as write enable signals and only assert an Enable Byte signal during a write operation by data processor 10. As previously mentioned, the Enable Byte signals should be configured as write enables when an address accessed by data processor 10 is within a range for memories or peripheral devices which communicate eight bits of data. In the present invention, memories 51 through 54 of memory bank 50 of FIG. 1 are such devices. When the external devices communicate only eight bits of data, there is generally no need to specify which portion of the data should be accessed. Therefore, a corresponding Enable Byte signal may be provided to a R/W input of the device to simply indicate when data processor 10 is writing a data value to be stored in a selected memory circuit.

As an example, assume a first address accessed by data processor 10 corresponds to a memory stored in memory bank 50. Therefore, the Chip Select1 signal will be asserted. Furthermore, assume that a user of data processing system 15 programmed the plurality of control registers 94 appropriately. Therefore, when control circuitry 102 indicates that memory bank 50 has been accessed, a corresponding one of the plurality of control registers 94 is also accessed. The corresponding one of the plurality of control registers 94 provides the EBControl signal to decode logic 105. Because memory bank 50 includes only memories which have eight bit wide data, the EBControl signal should be asserted. If the EBControl signal is asserted, decode logic 105 only asserts an appropriate subset of the plurality of Enable Byte signals when data processor 10 is executing a write operation. Note that when the plurality of Enable Byte signals function as write enable signals, data processor 10 may read all data provided by each of memories 51 through 54 of memory bank 50 without corrupting the data values stored in each. When data processor 10 performs a write operation to a specific one of memories 51 through 54, the Enable Bytes must be selectively asserted and negated such that the data value is written to the selected one of memories 51 through 54 and data in other memories is not corrupted. Decode logic 105 ensures that only an Enable Byte corresponding to a memory to be written is asserted and, therefore, only that memory is written.

At other points in operation of data processing system 15, the EBControl signal is negated and the plurality of Enable Byte signals should act as byte enable signals. When acting as byte enable signals, the Enable Byte signals should be asserted during either a read or a write operation by data processor 10. As previously mentioned, the Enable Byte signals should be configured as byte enables when an address accessed by data processor 10 is within a range for memories or peripheral devices which communicate more than eight bits of data. In the present invention, memories 56 through 58 of memory bank 55 of FIG. 1 are such devices. When the external devices communicate more than eight bits of data, there is generally a need to specify which portion of the data should be accessed. Therefore, corresponding Enable Byte signals should be provided to an upper byte (UB) input and a lower byte (LB) input of the device to indicate when data processor 10 is respectively accessing an upper byte and a lower byte of a data value in a selected memory circuit.

As an example, assume a second address accessed by data processor 10 corresponds to a memory stored in memory bank 55. Therefore, the Chip Select2 signal will be asserted. Furthermore, assume that a user of data processing system 15 programmed the plurality of control registers 94 appropriately. Therefore, when control circuitry 102 indicates that memory bank 55 has been accessed, a corresponding one of the plurality of control registers 94 is also accessed. The corresponding one of the plurality of control registers 94 provides the EBControl signal to decode logic 105. Because memory bank 55 includes only memories which have greater than eight bit wide data, the EBControl signal should be negated. If the EBControl signal is negated, decode logic 105 only asserts the Enable Byte signals which correspond to the accessed memory location.

In this second example, a first Enable Byte signal is needed for the UB input and a second Enable Byte signal is needed for the LB input of the memory being accessed. Furthermore, in this second example, decode logic 105 asserts the Enable Byte signals in response to the EBControl signal, the S1 signal, the S0 signal, the A1 signal, and the A0 signal. A function of each of these signals was previously explained in greater detail. Therefore, when the S1 and S0 signals are asserted to indicate that four bytes should be accessed, each of the Enable Byte signals 204 through 210 is asserted to enable data processor 10 to access the upper and lower bytes of data stored in both memory 56 and memory 58.

If only a single byte should be accessed, the S0 signal is asserted and the S1 signal is negated and provided to decode logic 105. The A1 and A0 signals are then used to determine whether an upper byte or a lower byte should be accessed. In this example, if data processor 10 writes a value only to the upper byte of an address value stored in memory 56, the Enable Byte 208 signal will be asserted. Additionally, the Chip Select2 signal and the Write Enable signal will be asserted.

Similarly, if two bytes are to be accessed, the S1 signal is asserted and the S0 signal is negated and provided to decode logic 105. The A1 and A0 signals are then used to determine whether both an upper byte and a lower byte should be accessed. In this example, if data processor 10 writes a sixteen bit value to an address value stored in memory 56, both the Enable Byte 208 signal and the Enable Byte 210 signal will be asserted. Additionally, the Chip Select2 signal and the Write Enable signal will be asserted.

A1 and A0 indicate an initial byte of the operand which may be one or more bytes in length.

Similarly, the flexible use of the plurality of Enable Byte signals may also be used to allow data processor 10 to communicate with integrated circuit 70 and integrated circuit 72.

The ability to selectively determine a function of the plurality of Enable Byte signals provides a flexible solution for a data processor which must communicate with an increasing number of peripheral devices having widely varying interface requirements. The present invention allows a control bit in a control register to determine which function the Enable Byte signals will perform on the basis of a current byte access. Therefore, the functionality of the Enable Byte signals may change dynamically from an access of one type of memory to another without software intervention. By providing such flexibility with little software intervention, the present invention provides a low-cost chip select logic circuit for use with all integrated circuit microprocessors.

The implementation of the invention described herein is provided by way of example only and many other implementations may exist for executing the function described herein. For example, the EBC bit in each of the plurality of control registers 94 may be expanded to include more bits and, therefore, provide for greater functionality.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

I claim:

1. A data processor, comprising:
   a central processing unit for communicating a plurality of address values, a plurality of data values, and a plurality of control values; and
   a system integration unit, the system integration unit, comprising:
   a compare circuit coupled to the central processing unit for receiving the plurality of address values, the compare circuit providing a compare signal indicating an address range which includes a first one of the plurality of address values;
   a control circuit coupled to the central processing unit for receiving the plurality of control values and coupled to the compare circuit for receiving the compare signal, the control circuit providing a first control value corresponding to a first external device and the control circuit providing a plurality of internal control signals;
   a control register coupled to the control circuit for receiving the first control value, the control register selectively providing a first enable byte control value in response to the first control value; and
   a decode logic circuit coupled to the control register for receiving the first enable byte control value, coupled to the control circuit for receiving the plurality of internal control signals, and coupled to the central processing unit for receiving the plurality of address values, the decode logic circuit logically combining the first enable byte control value, a portion of the plurality of internal control signals, and a portion of the plurality of address values to provide a first enable byte signal in one of a second and a third logic state, wherein the first enable byte signal performs a write enable function when in the second logic state and the first enable byte signal performs a byte enable function when in the third logic state.

2. The data processor of claim 1, further comprising:
   an integrated circuit terminal coupled to the decode logic circuit for receiving the enable byte signal, the integrated circuit terminal providing the enable byte signal.

3. The data processor of claim 1, further comprising:
   a plurality of control registers coupled to the control circuit for receiving the first control value, a first one of the plurality of control registers providing the first enable byte signal when the first control value is provided by the control circuit and a second one of the plurality of control registers providing a second enable byte signal when a second control value is provided by the control circuit.

4. The data processor of claim 3 wherein the second control value corresponds to a second external device.

5. The data processor of claim 3 wherein the plurality of control registers provide a plurality of enable byte signals to the decode logic circuit, the plurality of control registers providing each of the plurality of enable byte signals when a corresponding one of a plurality of control values is provided by the control circuit.

6. The data processor of claim 5 wherein each of the plurality of enable byte signals enable a preselected byte of data to be communicated by at least one of a plurality of external devices.

7. The data processor of claim 1 wherein the portion of the plurality of internal control signals comprises a size signal for indicating a size of a data value to be communicated in a data processing operation and a read signal for indicating whether the data value should be read or written during the data processing operation.

8. The data processor of claim 1 wherein the first enable byte signal performs the write enable function by enabling a selected external device when the central processing unit executes a write operation which accesses the selected external device.

9. The data processor of claim 8 wherein the first enable byte signal performs the write enable function by not enabling the selected external device when the central processing unit executes a read operation which accesses the selected external device.

10. The data processor of claim 1 wherein the first enable byte signal performs the byte enable function by enabling a selected external device when the central processing unit executes one of a read operation and a write operation.

11. The data processor of claim 10 wherein the first enable byte signal accesses one of an upper byte and a lower byte of the a first one of the plurality of data values when the central processing unit executes one of the read operation and the write operation.

12. The data processor of claim 10 wherein a chip select signal is asserted and provided to the selected external device.

13. The data processor of claim 12 wherein the first byte enable signal does not perform the byte enable function when the chip select signal is negated.

14. A data processing system, comprising:
   a first external device which selectively communicates a first data value via a data bus;
   a second external device which selectively communicates a second data value via the data bus; and
   a data processor, comprising:
   a central processing unit for communicating a plurality of internal address values, a plurality of internal data values, and a plurality of internal control values; and
   a system integration unit, the system integration unit, comprising:
   a compare circuit coupled to the central processing unit for receiving the plurality of internal address values, the compare circuit providing a first compare signal indicating an address range which includes a first one of the plurality of internal address values;
   a control circuit coupled to the central processing unit for receiving the plurality of control values and coupled to the compare circuit for receiving the first compare signal, the control circuit providing a first control value corresponding to the first external device and the control circuit providing a first plurality of internal control signals;
   a control register coupled to the control circuit for receiving the first control value, the control register selectively providing a first enable byte control value in response to the first control value;
   a decode logic circuit coupled to the control register for receiving the first enable byte control value, coupled to the control circuit for receiving the plurality of internal control signals, and coupled to the central processing unit for receiving the plurality of internal address values, the decode logic circuit logically combining the first enable byte control value, a portion of the plurality of internal control signals, and a portion of the plurality of address values to provide a first enable byte signal in one of a second and a third logic state, wherein the first enable byte signal performs a write enable function for the first external device when in the second logic state and the first enable byte signal performs a byte enable function for the first external device when in the third logic state; and a first integrated circuit terminal for providing the first enable byte signal to a first input of the first external device.

15. The data processing system of claim 14 wherein the control circuit provides a second control value corresponding to the second external device.

16. The data processing system of claim 15 wherein the control register is coupled to the control circuit for receiving the second control value and the control register selectively provides a second enable byte control value in response to the second control value.

17. The data processing system of claim 16 wherein the decode logic circuit logically combines the second enable byte control value, the portion of the plurality of internal control signals, and the portion of the plurality of address values to provide a second enable value in one of a fourth and a fifth logic state, wherein the second enable byte signal performs the write enable function when in the fourth logic state and performs the byte enable function when in the fifth logic state.

18. The data processing system of claim 17 wherein the second enable byte signal is provided to a second input of the first external device.

19. The data processing system of claim 18 wherein the first enable byte signal accesses a first portion of a data value stored in the first external device when in the third logic state and the second enable byte signal accesses a second portion of the data value stored in the first external device when in the fifth logic state.

20. A data processor, comprising:

a central processing unit for communicating a plurality of address values, a plurality of data values, and a plurality of control values;

a control circuit coupled to the central processing unit for receiving the plurality of control values, the control circuit providing a first control value and a plurality of internal control signals; and a first control register coupled to the control circuit for receiving the first control value, the first control register selectively providing a first enable byte control value in response to the first control value, the first enable byte control value indicating when a first enable byte signal performs a write enable function and when the first enable byte signal performs a byte enable function.

21. The data processor of claim 20 wherein the first enable byte control value is a bit stored in the first control register.

22. The data processor of claim 20 wherein the first control register corresponds to a first external device.

23. The data processor of claim 22 wherein the control circuit provides a second control value in response to the plurality of control values.

24. The data processor of claim 23 further comprising:

a second control register coupled to the control circuit for receiving the second control value, the second control register selectively providing a second enable byte control value in response to the second control value, the second enable byte control value indicating when a second enable byte signal performs a write enable function and when the first enable byte signal performs a byte enable function.

25. The data processor of claim 24 wherein the second control register corresponds to a second external device.

26. A method for accessing an external device in a data processor, comprising the steps of:

communicating a plurality of address values, a plurality of data values, and a plurality of control values with a central processing unit;

coupling a compare circuit to the central processing unit for receiving the plurality of address values;

enabling the compare circuit to provide a compare signal indicating an address range which includes a first one of the plurality of address values;

coupling a control circuit to the central processing unit for receiving the plurality of control values;

coupling the control circuit to the compare circuit for receiving the compare signal;

enabling the control circuit to provide a first control value corresponding to a first external device and the control circuit providing a plurality of internal control signals;

coupling a control register to the control circuit for receiving the first control value;

enabling the control register to selectively provide a first enable byte control value in response to the first control value;

coupling a decode logic circuit to the control register for receiving the first enable byte control value;

coupling the decode logic circuit to the control circuit for receiving the plurality of internal control signals;

coupling the decode logic circuit to the central processing unit for receiving the plurality of address values; and enabling the decode logic circuit to logically combine the first enable byte control value, a portion of the plurality of internal control signals, and a portion of the plurality of address values to provide a first enable byte signal in one of a second and a third logic state, wherein the first enable byte signal performs a write enable function when in the second logic state and the first enable byte signal performs a byte enable function when in the third logic state.

27. The method of claim 26, further comprising the steps of:

coupling a plurality of control registers to the control circuit for receiving the first control value;

enabling a first one of the plurality of control registers to provide the first enable byte signal when the first control value is provided by the control circuit; and enabling a second one of the plurality of control registers to provide a second enable byte signal when a second control value is provided by the control circuit.

28. The method of claim 27 wherein the second control value corresponds to a second external device.

29. The method of claim 27 wherein the plurality of control registers provide a plurality of enable byte signals to the decode logic circuit and the plurality of control registers provides each of the plurality of enable byte signals when a corresponding one of a plurality of control values is provided by the control circuit.

30. The method of claim 29 wherein each of the plurality of enable byte signals enables a preselected byte of data to be communicated by at least one of a plurality of external devices.

* * * * *